July 27, 1943.                    J. R. MILLAR                    2,325,265
                                 PAD MANUFACTURE
                              Filed May 29, 1939                5 Sheets-Sheet 1
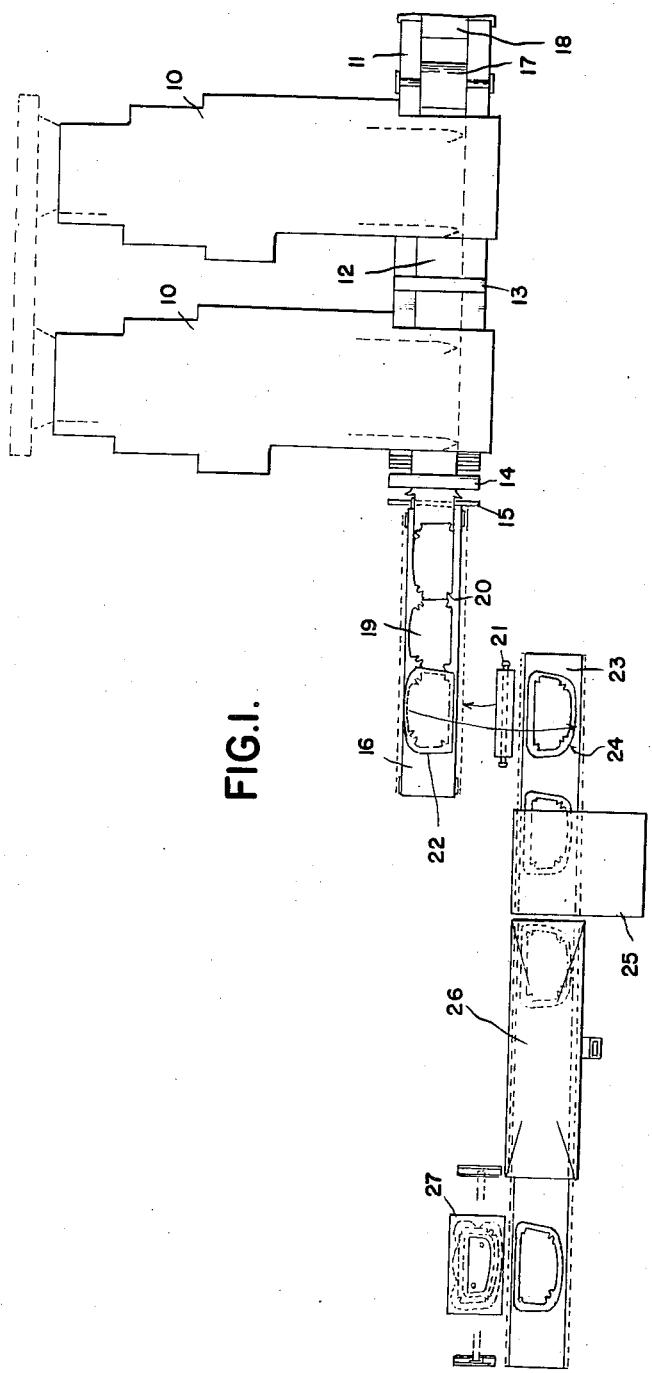
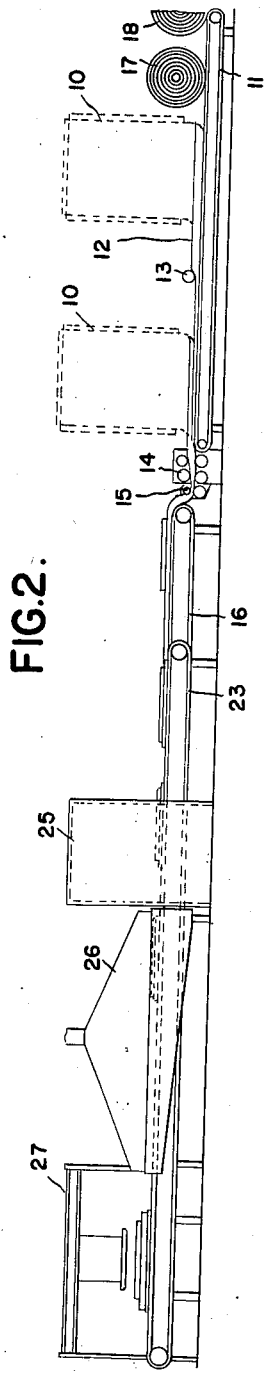
INVENTOR.
JOHN R. MILLAR
BY
Whittemore, Hulbert & Belknap
ATTORNEYS July 27, 1943.  J. R. MILLAR  2,325,265
PAD MANUFACTURE
Filed May 29, 1939  5 Sheets-Sheet 2
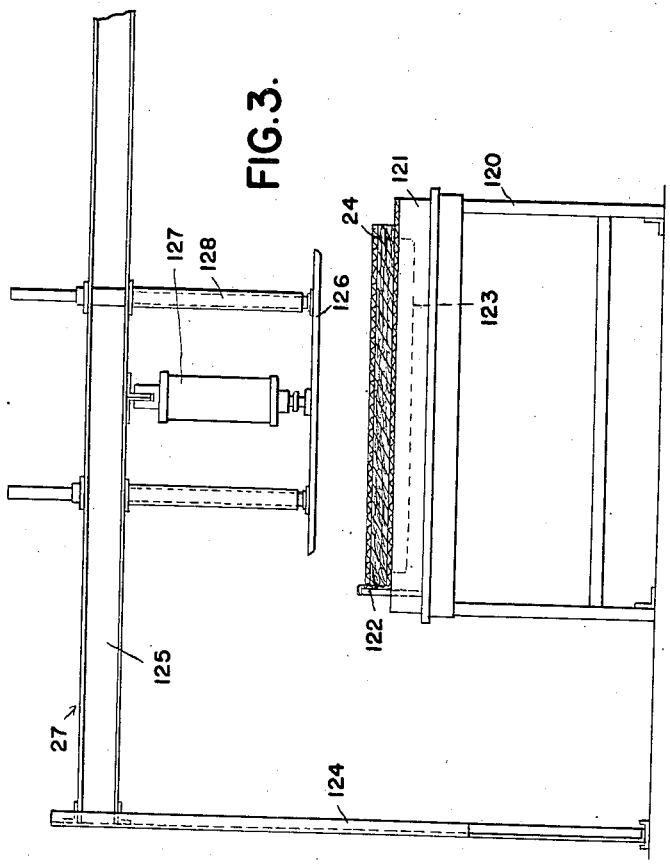
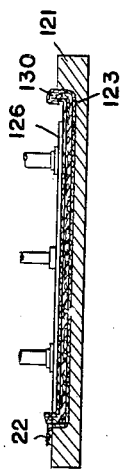
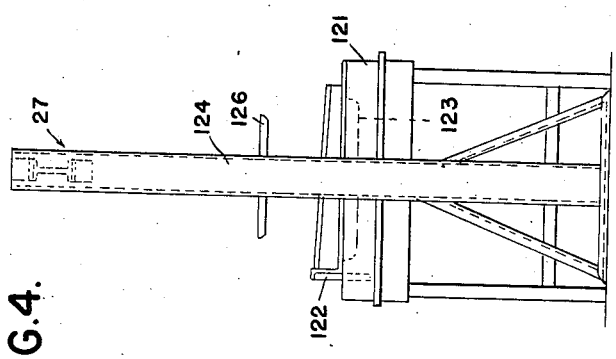
INVENTOR.
JOHN R. MILLAR
BY
Whittemore, Hulbert & Belknap
ATTORNEYS

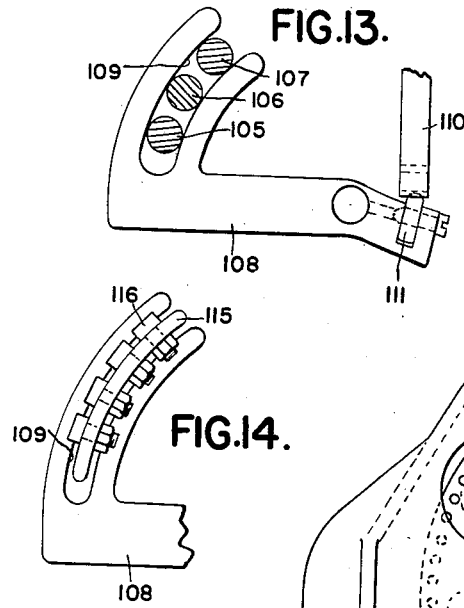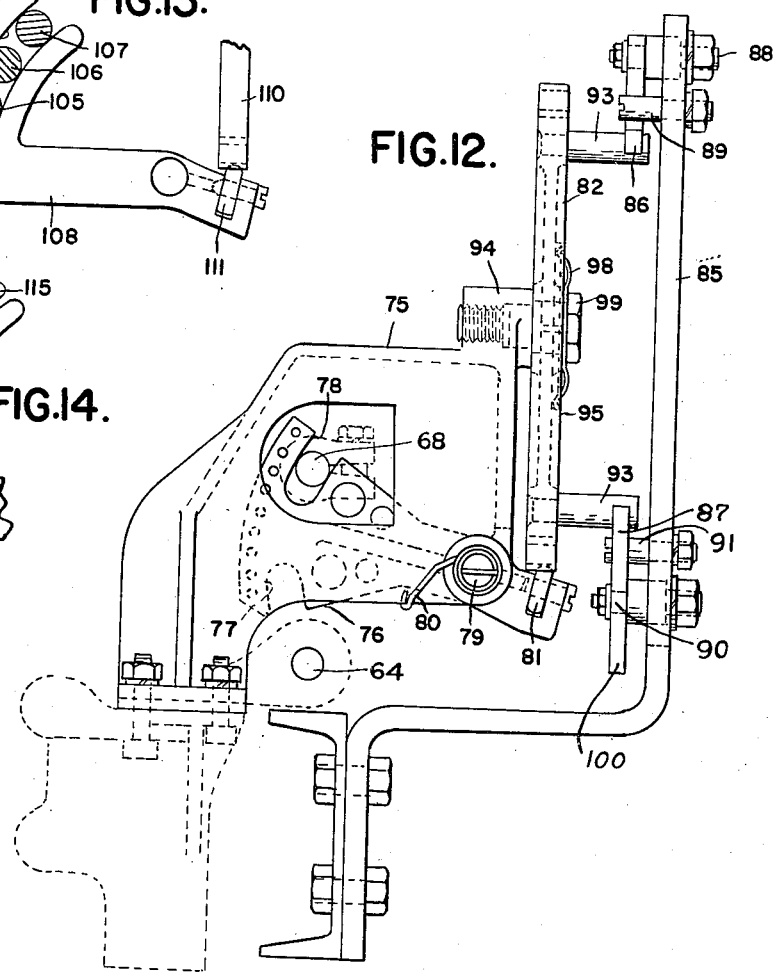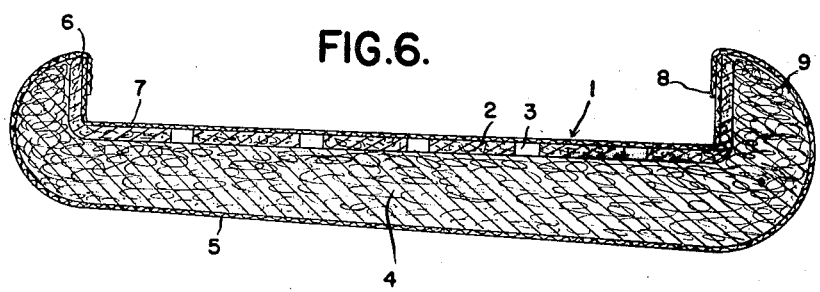

July 27, 1943.  J. R. MILLAR  2,325,265
PAD MANUFACTURE
Filed May 29, 1939    5 Sheets-Sheet 4
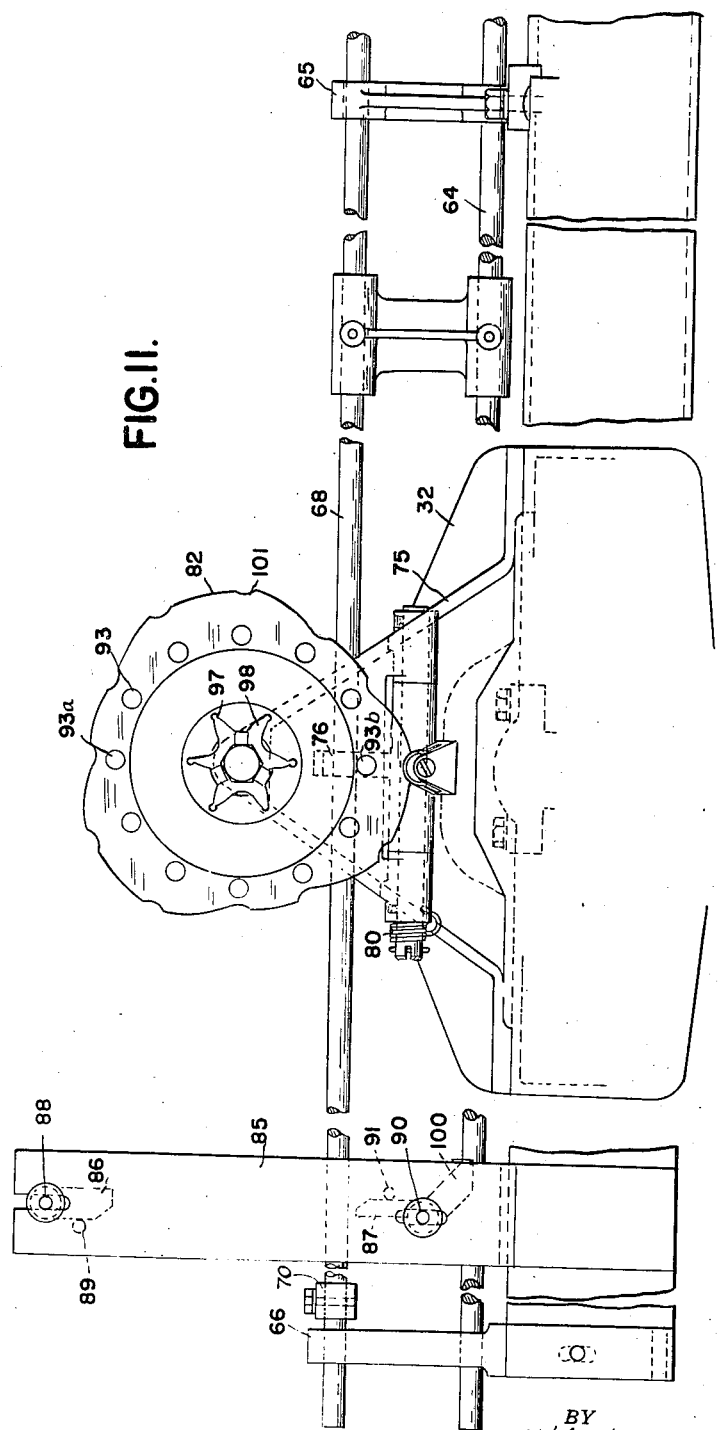
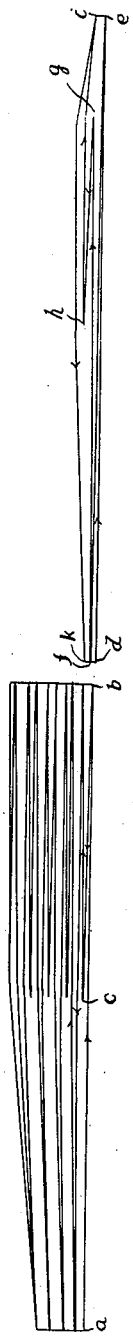
INVENTOR.
JOHN R. MILLAR
BY Whittemore, Hulbert & Belknap
ATTORNEYS

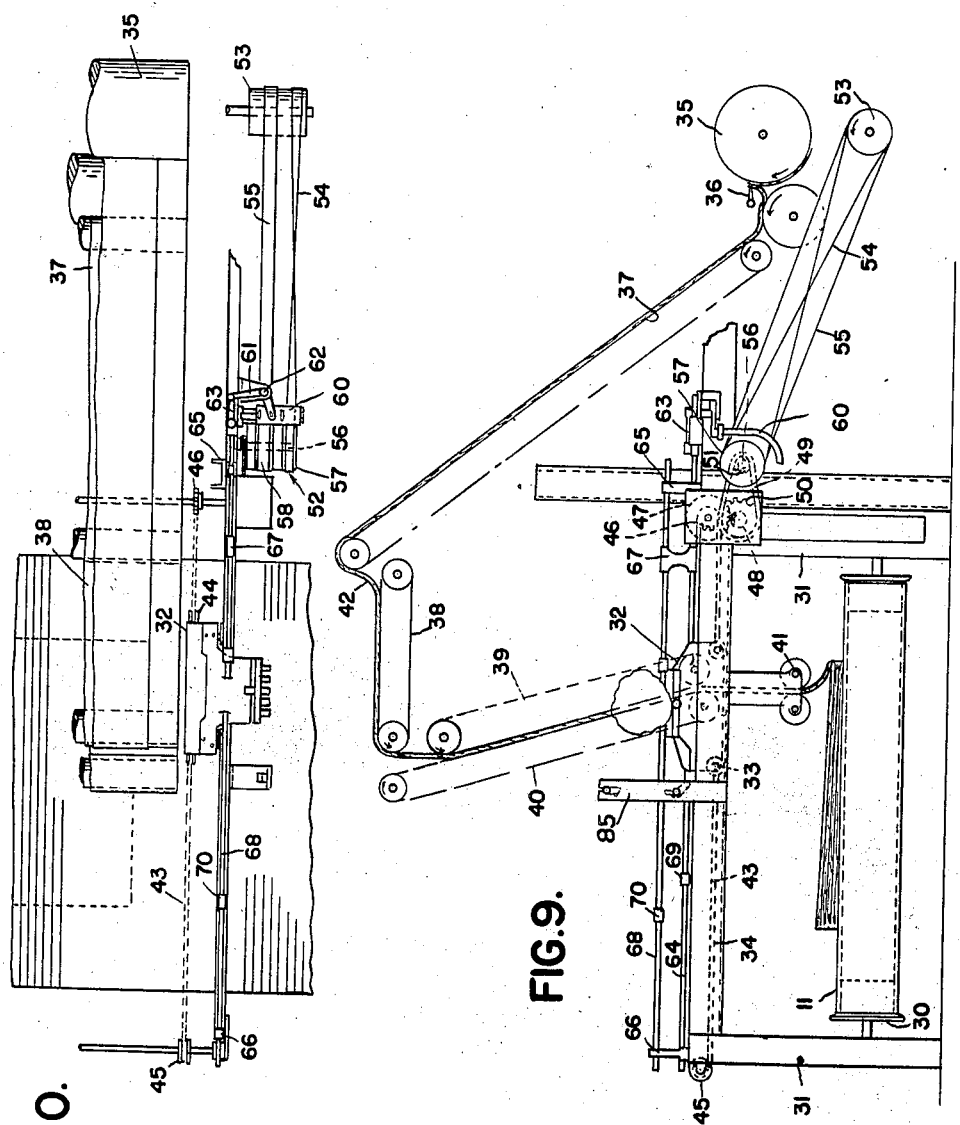

Patented July 27, 1943

2,325,265

UNITED STATES PATENT OFFICE 2,325,265

PAD MANUFACTURE

John R. Millar, Reno, Nev., assignor to National Automotive Fibres, Inc., Detroit, Mich., a corporation of Delaware Application May 29, 1939, Serial No. 276,432

14 Claims. (Cl. 19—163)

The present invention relates to pad manufacture and more particularly to the complete apparatus and method for the continuous manufacture of these articles.

In the manufacture of upholstered seats, and more particularly upholstered seats for automotive vehicles, it has in the past been the practice to provide a pad of fibrous material, such for example as cotton, intermediate a spring unit and a covering of upholstery material. The upholstery material, which may be broadcloth, mohair, or the like, may itself be formed into a stuffed cushion, or it may be applied to the padding material previously referred to merely as an overlying layer of fabric.

It has in the past been conventional practice to cut a pad of fibrous material, such for example as cotton, to the predetermined shape and to interpose the same between the spring unit and the upholstery material. It has also been the practice in the past to provide a so-called "insulator" intermediate the spring unit and the padding material, primarily for the purpose of preventing the material from sifting or working downwardly into the spring unit in use.

Recently it has been proposed to accelerate and improve the manufacture of vehicle seat constructions by forming a pad in a particular manner for interposition between the spring unit and the upholstery material. This pad essentially comprises a lowermost base formed to provide a recess adapted to receive an upper portion of the spring unit, and an overlying layer of loosely aggregated fibrous material, such as cotton. In order to retain the parts in their assembled relation and to render them suitable for comparatively rough handling, there is provided a fabric, such for example as tobacco cloth or sheeting, which overlies the padding material and is secured at its edges to the base. In some instances it has been proposed to provide a spray coating of latex for the tobacco cloth, and preferably this tobacco cloth or sheeting has its edges folded into the recess in the base and adhered therein.

According to one embodiment of the pad as previously suggested, the base is formed of a coarse fibrous material, such for example as sisal or jute. For this purpose sisal is preferred, since it appears to give substantially better results, although in its broadest aspects, any equivalent material may be employed. It has also been suggested to coat or provide a relatively shallow impregnation of the fibrous base with a suitable adhesive material, such for example as latex.

The base may, after this treatment, be compressed throughout its surface area, providing a relatively hard coating which serves the purpose of assisting the base to retain its formed shape, and which also provides a surface coating which tends to prevent disintegration of the base and the resultant downward sifting of detached fibers.

This pad may be employed as an improved substitute for the simple cotton pad previously used. It may, if desired, be placed directly over the spring unit or, if preferred, an insulator fabric, such for example as burlap, may be interposed between the spring unit and the pad. As an alternative, the burlap may be adhered to the lower surface of the formed base in order that the whole assembly may be placed over the spring unit in a single operation.

It has been found that the pad as thus far described has substantially improved properties, where specific provisions are made to provide for relatively free passage of air into and out of the pad. This passage of air is commonly referred to as "breathing." For this purpose I prefer to provide the fiber base with a plurality of apertures which permit free passage of air therethrough.

It is a primary object of the present invention to provide an improved apparatus and method for forming and assembling pads of the nature described. The apparatus which I find best adapted to perform that function includes mechanism for building up on a moving conveyor a continuous, tapered batt of cotton, which may then subsequently be cut into the desired outline. In this connection, I have devised novel apparatus for controlling the deposit of fibrous material on a conveyor in a manner to build up the tapered batt, and this forms another object of my invention.

A further object of my invention is to provide an assembly line characterized by the efficient correlation of stations in part for rendering more efficient the formation and assembly of my improved pad.

Other objects of the invention will be apparent as the description proceeds, and when taken in conjunction with the accompanying drawings, wherein Figure 1 is a plan view showing the layout of the assembly line and the associated mechanism;

Figure 2 is a side view of the assembly line shown in Figure 1;

Figure 3 is an elevation partly in section of the pad forming station;

Figure 4 is an end view of the station shown in Figure 3;

Figure 5 is a fragmentary detail showing the forming operation on the pad;

Figure 6 is a section of a pad made according to the present invention;

Figures 7 and 8 are diagrammatic views indicating the feed strokes of the fiber depositing apparatus;

Figure 9 is an elevation illustrating the mechanism for depositing fibrous material on the conveyor;

Figure 10 is a plan view of the apparatus shown in Figure 9;

Figure 11 is an enlarged elevation showing the control means for the fiber depositing mechanism;

Figure 12 is an end view of the mechanism shown in Figure 11; and

Figures 13 and 14 are fragmentary details illustrating somewhat modified control means for the fiber depositing mechanism.

The pad which is the product of the method and apparatus herein described is illustrated in Figure 6. In this figure the pad 1 is shown in vertical section and in inverted position. It comprises generally a base member 2 preferably provided with a plurality of spaced apertures 3, an intermediate pad of loose fibrous material, such for example as cotton 4, and an overlying ply of sheeting or tobacco cloth 5. The base 2 and the pad 4 are formed to provide flanges 6, which in turn define a recess adapted to receive the upper portion of the conventional spring unit provided in automobile upholstery. If desired, a ply of fabric 7, such for example as burlap, may be provided, which is adapted to underlie the lower surface of the base 2 when the pad is assembled in the vehicle. This ply of burlap is optional, and may, if desired, be omitted. The sheeting or fabric 5 has its edges formed inwardly and adhesively secured to the inside of the flanges 6, as indicated at 8. As indicated in this figure, the pad is tapered from front to back, and in addition the edges of the cotton are feathered or of reduced thickness in order to avoid bulkiness in the completed article. By feathering the edges as indicated at 9, the upholstery may be drawn smoothly into its final position over the rounded edges of the pad unit.

Referring next to Figures 1 and 2, I illustrate the complete assembly. A plurality of cotton treating devices, such for example as Garnetts, are illustrated at 10, each arranged to deposit a thin, continuous film of cotton on a moving conveyor 11. As will be well understood, these Garnetts are of the type provided with depositing means, movable transversely of the conveyor 11, so that the batt is built up of a plurality of overlapping webs which are arranged in a zigzag formation longitudinally of the conveyor.

The apparatus which controls the Garnetts in order to build up tapered batts will be subsequently described in detail. At present it is sufficient to observe that the cotton is built up in a batt indicated at 12, which passes under a suitable compression roller 13 intermediate the Garnetts and a second compression roll 14 after it emerges from the last Garnett.

This web is made somewhat wider than the desired width of the final product, and it is trimmed to predetermined width by a trimmer knife arrangement indicated at 15. The trimmed batt is deposited on a moving conveyor 16, at which time it is cut into a plurality of individual cushions. Preferably this trimming operation is performed by placing templates over the batt and following the edge of the template by means of a suitable cutting device.

As previously indicated, it is desired to associate the cotton batt with a base of a coarse fibrous material, such for example as sisal. In Figures 1 and 2 I have indicated this fibrous material as supplied in the form of rolls 17 placed on the conveyor 11, with the result that the cotton, as it is built up into a tapered batt, is formed directly on the coarse fibrous material 17.

It may be noted here that, if desired, a second roll of fabric 18, such for example as burlap, may also be provided on the conveyor 11 in such relationship that it will underlie the coarse fibrous material 17.

From the foregoing it will be apparent that when the padding material is cut to predetermined shape on the conveyor 16, the pad of coarse fibrous material and the underlying sheet of burlap, if such is provided, is also simultaneously cut to the same shape.

As best seen in Figure 1, the pads indicated at 19 are cut to substantially the final desired outline, notches indicated at 20 being provided for the purpose of facilitating formation of the edges of the padding material into outwardly projecting flanges, as will subsequently be described.

It should be emphasized at this time that the cotton which is deposited by the Garnett forms an extremely frail and fragile batt. It is desirable to avoid direct handling of this batt as much as possible. For this reason, while the cotton still is in the uppermost position, as indicated in Figure 1, on the conveyor 16, a precut fabric, such as tobacco cloth or sheeting, or the like, is removed from a support 21 and is positioned over the assembled pad 19. This fabric, which is indicated at 22, has an outline corresponding generally in shape to the outline of the assembled pad, but is somewhat larger so that its edges project for a purpose which will subsequently appear.

At this time the fragile cotton padding material is received between a relatively strong ply of coarse fibrous material and an uppermost covering of a fabric. This assembly may now be grasped and inverted on to the conveyor 23. In grasping the assembly for transfer from the conveyor 16 to the conveyor 23, the operator contacts directly the lowermost pad of coarse fibrous material (or the burlap ply where provided), and the uppermost ply of the light fabric. During inversion of the assembly therefore, the fragile cotton pad is retained in place between the two outer plies referred to.

It will therefore be apparent that the assembly, as positioned on the conveyor 23, comprises the following: A lowermost ply of precut fabric or sheeting, next the precut cotton padding material, next the coarse fibrous material, and finally the burlap, where such is provided. I have designated this assembly on the conveyor 23 as 24.

At this point in the operation, an operator sprays the exposed surface of the assembly 24 with a suitable adhesive. This adhesive may take the form of suitable latex, if desired, or any other adhesive which answers the purpose may, of course, be substituted. It may be noted that where the burlap is to be combined with the complicated article, it may in some cases be preferred to add a precut ply of burlap at this point, subsequently to a spraying operation which covers or provides a relatively shallow surface impregnation of the coarse fibrous material 17. This provides for a firm adhesive bond between the burlap and the coarse fibrous material, which forms the base of the assembled pad. It may be observed that this burlap may be provided with an adhesive bond to the base by other means, such for example as spraying the upper surface of the burlap before it passes underneath the roll of fibrous material 17 on the conveyor 11.

This spraying operation also provides a coating of latex or other adhesive on the upwardly exposed, outwardly extending edges of the sheeting 22 for a purpose which will presently appear. This spraying operation may conveniently take place directly on the conveyor 23, but preferably I provide a spray booth 25 in which spraying takes place. After the articles 24 have been sprayed in the booth 25, they are advanced by the conveyor 23 through a drying chamber 26, which may, if desired, have a connection 27 for heated air, or the like. It is desired to only partially dry the adhesive in order to render more effective the subsequent operations. The assembly 24 as it emerges from the drying chamber 26 is next transferred to a buck or press, indicated generally at 27, and subsequently described in detail. For the present it is sufficient to note that the buck 27 comprises a female mold over which the assembly 24 is positioned, with the sheeting 22 lowermost. A pressure plate is next brought down, forming the assembly in the mold to provide upwardly extending flanges over which the extending edges of the sheeting 22 are folded and adhered inside the flanges, thus completing the article.

Referring now particularly to Figures 7 to 14, I illustrate the apparatus for building up a continuous tapered batt.

As previously stated, this batt is built up on the moving conveyor 11 by means of a transversely movable depositing element, which deposits a zigzag film of fibrous material on the conveyor. In order to build up the tapered batt, it is necessary only to control the stroke of this reciprocating depositing member. As shown in Figure 7, a batt which is tapered at one side only may be produced by causing the reciprocating depositing member to follow the lines indicated in this figure. Thus, for example, if the deposit is started at the point $a$ and is continued across the full width of the batt to the point $b$ and is then reversed to the point $c$, a batt having substantially double thickness at one side will be produced. In like manner, referring to Figure 8, the batt may be formed having any desired contour. Thus, for example, the depositing member may start from the point $d$ and continue completely across the conveyor to the point $e$. From this point it may reverse itself to the point $f$ at the first side of the conveyor. It may then reverse and continue to a point $g$, which is spaced inwardly from the point $e$. Reversal this time may result in a translation to the point $h$, at which point reversal again occurs, followed by translation to the point $i$. From the point $i$ translation to the point $k$ completes a cycle. It will be apparent that by means of this cycle a pad may be built up which is tapered at both edges.

Referring now particularly to Figures 9 and 10, I illustrate the conveyor 11 carried by rollers 30, supported in suitable frame members 31. The cotton depositing means takes the form of a carriage 32, provided with wheels 33 adapted to roll on a trackway formed by suitable angle members 34 carried by the frame 31. Cotton from the Garnetts 10 is removed from a roll 35 by a suitable doffer mechanism 36 and advances upwardly by means of a conveyor 37, from which it is deposited on a second conveyor 38. At this point the continuous film of cotton passes downwardly between opposed conveyors 39 and 40, which eventually supply this film of cotton from between rollers 41. It will be appreciated that the cotton, which I have indicated in Figure 9 as 42, is of substantial width in a direction measured longitudinally of the conveyor 11.

Suitable automatic mechanism is provided for controlling reciprocation of the carriage 32. Preferably this mechanism takes the form of a chain 43 connected at its ends as indicated at 44 to the carriage 32. An idle sprocket 45 is provided over which the chain runs, and a second driving sprocket 46 is provided for driving the chain reversely. Sprocket 46 is carried by a shaft which also carries a gear 47 meshing with a second gear 48. Gear 48 is driven by means of a chain 49 from a sprocket 50. The chain 49 in turn is driven from a sprocket 51, which in turn is driven from a reversing pulley arrangement indicated generally at 52.

In order to reverse the sprocket 51 and so reverse travel of the carriage 32, a driving pulley 53 is provided having a crossed belt 54 and a straight belt 55 adapted to connect with suitable fixed and loose pulleys on the shaft 56. The arrangement is such that with the parts as shown in Figure 10, one of the belts, for example the crossed belt 54, is driving a loose pulley 57 while the straight belt 55 is driving a pulley 58, keyed or otherwise connected to the shaft 56.

In order to reverse rotation of the sprocket 51, a shifter fork 60 is provided, having depending fingers adapted to engage the belts and mechanically move them from one pulley to the next.

In order to provide shifting of the shifter fork member 60, the member is connected to one arm of a bell crank 61, which is pivoted at 62 and which is operatively connected as by means of a link 63 to a rod 64.

The rod 64 is mounted in brackets 65 and 66 for longitudinal movement, and is connected by means of a rigid connection 67 to a second rod 68. The rods 64 and 68 are provided with adjustable stops 69 and 70, respectively. Separate adjustable stops may be provided adjacent both ends of each of the rods or if desired, the connection 67 may reverse the movement of the carriage 32 as it moves to the right, as seen in Figure 11. Means are provided on the carriage 32 for engaging the adjustable stops 69 and 70 and other stops, if desired, for controlling the point of reversal of the carriage 32. These means are illustrated in detail in Figures 11 and 12, to which reference is now had.

Secured to the carriage 32 is an upwardly extending bracket 75 to which is pivoted an actuator plate 76. The plate 76 is provided with recesses 77 and 78 and is rockable about pivot pin 79 so that the recesses 77 and 78 alternately receive rods 64 and 68. As will be evident, as the carriage 32 is moved in one direction, the point of reversal will be determined by the adjustment of the stops 70 or 69, depending upon with which rod the actuator 76 is engaged.

The shaft 79 which carries the actuator 76 is provided with a spring 80 which urges the actuator in a counterclockwise direction, as seen in Figure 12. At the opposite end of the actuator 76 from the recesses 77 and 78 is provided a roller 81 which is adapted to engage the periphery of a cam wheel 82. The cam wheel 82 is intermittently rotated responsive to translation of the carriage 32, and in each position will determine which of the two rods 64 and 68 will be engaged by the actuator.

The mechanism which provides for predetermined intermittent rotation of the cam wheel 82 takes the form of a stop bracket 85 having pivoted thereto stop members 86 and 87. The stop member 86 is pivoted about an axis 88, and its rotation in a clockwise direction (Figure 11) is prevented by a stop pin 89. Stop member 87 is pivoted about an axis 90, and its rotation in a clockwise direction is prevented by a stop pin 91.

The cam plate 82 has secured thereto a plurality of laterally extending pins 93, all concentric with the bearing 94 which supports cam wheel 82 for rotation. In order to control rotation of the cam wheel, a washer or friction member 95 is provided, having recesses 97 for receiving the points of a star shaped resilient washer 98. The washer 98 is retained against rotation relative to the stud bolt 99, and accordingly retains the friction member 95 against rotation. Friction member 95 has extended bearing with the cam wheel 82 and permits its rotation only when directly actuated by the control means now to be described.

The pins 93 are arranged so that only the uppermost and lowermost of the series is adapted to contact with the stops 86 and 87, respectively.

Referring now to Figure 11, and assuming that the carriage 32 is moving to the left in this figure, it will be noted that the uppermost pin 93a will contact the stop 86, which in turn is held against rotation by the stop pin 89. At the same time the lowermost pin 93b will contact the stop 87, but this stop is not held against rotation and will accordingly be rotated away from its stop pin 91. The lowermost stop 87 is provided with a weighted projection 100 which will return the stop to position against the stop pin 91 after the carriage 32 has passed. Engagement between the uppermost pin 93a and the stop 86 will accordingly result in a clockwise rotation of the cam plate 82. This rotation will force the roller 81 of the actuator 76 out of the recess 101 in which it is then resiliently retained by the spring 80. The arrangement of parts is such that the rotation is substantially sufficient to bring the next succeeding recess 101 into registry with the roller 81, and the roller 81 thereupon resiliently drops into the next recess 101. As will be apparent from Figure 12, the resulting movement of the actuator 76 about its pivot will cause the actuator to successively engage the rods 64 and 68 in a predetermined cycle.

In order to form the tapered batt with any desired configuration, it is necessary only to adjust the stops 69 and 70, or change the cam wheel if it is desired to alter the weight of the center of the pad relative to the sides.

In some instances it may be desirable to provide for more flexibility of control, in which case a plurality of rods, such for example as the three indicated at 105, 106, 107 may be provided. In this case, instead of providing an actuator 108 with two oppositely disposed recesses, it may be provided with a single arcuate slot 109. It will be understood, of course, that in this embodiment as in that just described, each of the rods may be provided with a pair of adjustable stops, and that the point of reversal will be determined by the position of the actuator 108, which in turn will be determined by a cam wheel 110, similar in all respects to that shown at 82, with the exception, of course, that the recesses for receiving the roller 111 will be provided on three different diameters.

As will be understood, the cam wheel 110 will cause the arms of actuator 108 to embrace the lower rod, the lower two rods, or all three rods. It is therefore necessary to employ stops on the upper rod for reversal near the center of the stroke, and stops on the lower rod for reversal at the end of stroke.

A somewhat different embodiment of the present invention involves substitution of a single arcuately curved plate 115 for the plurality of rods. Plate 115 may be provided with stops in the form of bolts 116 longitudinally adjustable therealong in elongated slots. It will be appreciated that an actuator, such as shown at 108 in Figure 13, will cooperate satisfactorily with the device shown in Figure 14, the cam wheel being provided in this instance with recesses formed on four different diameters.

Referring now particularly to Figures 3, 4 and 5, I have illustrated the buck or press 27. This takes the form of a table or stand 120 which carries a recessed form or mold 121. One or more pins 122 are positioned about the periphery of recess 123 of the mold in order to serve as an aid in positioning the assembly 24 relative thereto.

A suitable framework, illustrated as comprising an upright 124, and an overhead beam 125 is provided for supporting a pressure plate 126 directly over the mold 121. This pressure plate may conveniently take the form of a flat metal plate of a size somewhat smaller than the recess 123, all as well illustrated in Figure 5 in which the pressure plate 126 is shown in lowermost position.

Suitable pressure means, which may take the form of an air cylinder 127, or the like, are provided, and are connected between the beam 125 and the pressure plate 126. When the pressure is supplied to the cylinder 127, pressure plate 126 is moved downwardly into the mold 121, thus forming the projecting edges of the assembly upwardly into a flange formation. Suitable guides indicated generally at 128 insure accurate registry between the pressure plate and the mold.

As previously stated and as indicated in Figure 1, the fiber base material and the fiber padding material are preferably cut with notched corners, as indicated at 29. These notches facilitate the formation of the edges of the assembly into upstanding flanges, as indicated at 130 in Figure 5.

Also, as previously described, the exposed edges of the sheeting 22, as well as the upper edges of the base material, have been coated with an adhesive. At this time an operator folds the sheeting 22 over the projecting flange edges 130 and adhesively secures them inside the flanges, as indicated at the right in Figure 5. The fabric serves the dual function of retaining the loose, fragile cotton against the base material, and also, as will be readily evident, serves to retain the flanges in their formed formation.

By the foregoing described method and by employing the herein described apparatus, I make it possible to produce pads of the character described efficiently and rapidly and with a high degree of uniformity. The uniformity of the pads is one of the most important characteristics, since it is this characteristic which does as much as anything else to accelerate final assembly of the vehicle seat constructions. According to present conventional practices in which a loose pad of cotton is placed over the spring, it is ordinarily necessary for the upholsterer to pluck portions of cotton here and there in order to obtain adequate uniform results. By the present method, in which the pads are all substantially uniform, the final assembly operation resolves itself into the step of simply placing the preformed pad over the spring unit and drawing the upholstery material over the pad.

The present method and apparatus in its broader aspects is capable of producing pads having the general characteristics referred to, but differing in numerous details. It has previously been indicated that the lower ply of burlap may or may not be employed, as desired. It will also be evident, of course, that the lower ply of relatively coarse fibrous material which forms the base member need not be apertured, although it has been found that the apertures add substantially to its operating characteristics. In like manner, if desired, adhesive may be supplied to the cotton while it is on the conveyor 16, previous to superposing of the fabric 22. Other details will suggest themselves to those familiar with the art.

While I have illustrated and described only a few specific embodiments of my invention, it will be apparent to those skilled in the art that various additions, modifications, omissions, combinations and substitutions may be made which will be within the spirit and scope of my invention as defined by the appended claims.

What I claim as my invention is:

1. Apparatus for building up a continuous batt of tapered thickness which comprises, a conveyor, means for depositing on said conveyor a thin web of substantial width, with the width of said web extending parallel to said conveyor, drive means for moving said depositing means transversely of said conveyor, reversing means for said drive means, and automatically operable cyclical presetting means for said reversing means for effecting reversal of said depositing means at different points, said presetting means comprising a plurality of movable abutments separately operable upon movement of said depositing means in one direction and effective upon movement to actuate said reversing means, and actuator means movable with said depositing means for engaging and moving one of said abutments, and automatic control means for said actuator for causing it to selectively engage said abutments in a predetermined sequence.

2. Apparatus for building up a continuous, transversely tapered batt comprising a longitudinally movable conveyor, a carriage including a film feeding means movable transversely of said conveyor, drive means for said carriage, reversing means for said drive means including abutment means movable between two positions to effect reversal of said drive means, abutment means movable with said carriage to engage said first abutment means, one of said abutment means comprising a plurality of abutment portions, the other of said abutment means being shiftable so as to engage one or another of said abutment portions, and programming means operable in response to movement of said carriage for shifting said other abutment means to engage said abutment portions in a predetermined sequence.

3. In apparatus adapted to build up a batt of fibrous material on a moving conveyor by transverse reciprocatory movement of a fiber depositing carriage, programming means for said carriage comprising a reversing bar shiftable to reverse said carriage, a plurality of abutments fixed relative to said bar, an actuator movable with said carriage and adjustable to engage any one of said abutments, and means actuated by movement of said carriage for adjusting said actuator to engage said abutments in a predetermined sequence, said last named means comprising rotary cam means mounted for step-by-step rotation on said carriage and having camming portions which position said actuator means, and a stop past which said carriage moves engageable with said cam means for rotating said cam one step in response to translation of said carriage.

4. In apparatus adapted to build up a batt of fibrous material on a moving conveyor by transverse reciprocatory movement of a fiber depositing carriage, programming means for said carriage comprising a reversing bar shiftable to reverse said carriage, a plurality of abutments fixed relative to said bar, an actuator movable with said carriage and adjustable to engage any one of said abutments, said abutments being arranged in an arcuate relation, said actuator comprising a pivoted member having an arcuate slot corresponding to the arcuate arrangement of said abutments, and means actuated by movement of said carriage for pivoting said actuator to engage said abutments in a predetermined sequence.

5. Apparatus for building up a continuous batt of nonuniform thickness which comprises a conveyor, depositing means movable transversely of said conveyor adapted to deposit a thin web of substantial width on said conveyor in overlapping folds, a reversible drive for said carriage, reversing mechanism for said drive comprising shifting means movable transversely of said conveyor, said reversing mechanism also including relatively adjustable abutments carried by said depositing means and said shifting means, one of said means having a plurality of said abutments separately engageable by the abutment carried by said other means on different strokes of said depositing means in the same direction, and a programming device actuated by travel of said depositing means to effect adjustment of the abutment carried by said other means to engage different ones of said plurality of abutments upon successive strokes of said depositing means to effect reversal of said depositing means upon successive strokes in the same direction at different points.

6. Apparatus for building up a continuous batt of tapered thickness, comprising a conveyor, means for depositing on said conveyor a thin web of substantial width, drive means for moving said depositing means transversely of said conveyer, reversing means for said drive means, and automatically operable cyclical presetting means for said reversing means for effecting reversal of said depositing means, said presetting means comprising a plurality of movable abutments separately operable during movement of the depositing means in one direction to actuate the reversing means, and actuator means movable with said depositing means and operable during travel of the latter in the one direction aforesaid to engage and move one of said abutments, said actuator means being automatically cyclically operated to engage one of said abutments, the construction and arrangement of parts being such that reversal of the depositing means may take effect at different points in the travel of the depositing means in the one direction by engagement of the actuator means with a separate one of the plurality of abutments on different strokes of the depositing means in the one direction.

7. In apparatus adapted to build up a batt of fibrous material on a moving conveyor by transverse reciprocatory movement of a fiber depositing carriage, programming means for said carriage comprising connected reversing bars shiftable to reverse said carriage, abutments fixed relative to said bars and separately operable during movement of said carriage in one direction to actuate said bars, an actuator movable with said carriage and operable during travel of the carriage in the one direction aforesaid to engage one of said abutments, and means actuated by movement of said carriage for adjusting said actuator to engage one of said abutments, the construction and arrangement of parts being such that reversal of the carriage may take effect at different points in the travel of the carriage in the one direction by engagement of the actuator with a separate one of the plurality of abutments on different strokes of the carriage in the one direction.

8. Apparatus for building up a continuous batt of tapered thickness, comprising a conveyor, means for depositing on said conveyor a thin web of substantial width, drive means for moving said depositing means transversely of said conveyor, reversing means for said drive means, means including a plurality of abutments separately operable during movement of said depositing means in one direction to actuate the reversing means, and actuator means movable with said depositing means and operable during travel of the latter in the one direction aforesaid to engage one of said abutments to effect reversal of said depositing means, the construction and arrangement of parts being such that reversal of the depositing means may take effect at different points in the travel of the depositing means in the one direction by engagement of the actuator means with a separate one of the plurality of abutments on different strokes of the depositing means in the one direction.

9. In apparatus adapted to build up a batt of fibrous material on a conveyor by reciprocatory movement of a fiber depositing carriage, programming means for said carriage comprising a reversing member shiftable to reverse said carriage, a plurality of abutments adjustable relative to said member and separately operable during movement of said carriage in one direction to actuate said member, an actuator movable with said carriage and operable to engage one of said abutments, and means actuated by movement of said carriage when it is travelling in the one direction aforesaid for adjusting said actuator to engage one of said abutments, the construction and arrangement of parts being such that reversal of the carriage may take effect at different points in the travel of the carriage in the one direction by engagement of the actuator with a separate one of the plurality of abutments on different strokes of the carriage in the one direction.

10. Apparatus for building up a fibrous batt of predetermined configuration, comprising a conveyor, means movable back and forth over the conveyor for depositing fibrous material on said conveyor, drive means for said depositing means, reversing means for said drive means, and automatically operable cyclical presetting means for said reversing means for effecting reversal of said depositing means, said presetting means including a plurality of movable abutments separately operable upon movement of said depositing means in one direction and effective upon movement to actuate said reversing means, actuator means movable with said depositing means and operable to engage and move one of said abutments, and automatic means for adjusting said actuator to engage one of said abutments, the construction and arrangement of parts being such that reversal of the depositing means may take effect at different points in the travel of the depositing means in the one direction by engagement of the actuator means with a separate one of the plurality of abutments on different strokes of the depositing means in the one direction.

11. Apparatus for building up a fibrous batt of predetermined configuration, comprising a conveyor, means movable back and forth over the conveyor for depositing fibrous material on said conveyor, drive means for said depositing means, reversing means for said drive means, and automatically operable cyclical presetting means for said reversing means for effecting reversal of said depositing means, said presetting means comprising a plurality of movable abutments in the path of said depositing means when travelling in one direction and effective upon being moved to actuate said reversing means, and actuator means movable with said depositing means and operable during travel of the latter in the one direction aforesaid to engage one of said abutments, said actuator means being automatically cyclically operated to engage one of said abutments, the construction and arrangement of parts being such that reversal of the depositing means may take effect at different points in the travel of the depositing means in the one direction by engagement of the actuator means with a separate one of the plurality of abutments on different strokes of the depositing means in the one direction.

12. Apparatus for building up a fibrous batt of predetermined configuration, comprising a conveyor, means movable back and forth over the conveyor for depositing fibrous material on said conveyor, drive means for said depositing means, reversing means for said drive means, means including a plurality of abutments separately operable during movement of said depositing means in one direction to actuate the reversing means, and actuator means movable with said depositing means and operable during travel of the latter in the one direction aforesaid to engage one of said abutments, the construction and arrangement of parts being such that reversal of the depositing means may take effect at different points in the travel of the depositing means in the one direction by engagement of the actuator means with a separate one of the plurality of abutments on different strokes of the depositing means in the one direction.

13. Apparatus for building up a batt of fibrous material, comprising a support for said material, means movable back and forth over said support for depositing the material on said support, drive means for the depositing means, and means for controlling the action of said drive means including a shifter element for said drive means, means including a pair of interconnected rods for actuating the shifter element, adjustable abutments on the rods and separately operable during movement of the depositing means in one direction relative to said support to actuate the rods, actuator means carried by the depositing means and operable when the latter is moving in the one direction aforesaid to engage one of said abutments, and means actuated by movement of the depositing means for causing the actuator means to engage one of said abutments as aforesaid, the construction and arrangement of parts being such that reversal of the depositing means may take effect at different points in the travel of the depositing means in the one direction by engagement of the actuator means with a separate one of the plurality of abutments on different strokes of the depositing means in the one direction.

14. Apparatus for building up a batt of fibrous material, comprising a support for said material, means movable back and forth over the support for depositing the material on said support, drive means for the depositing means, and means for controlling the action of said drive means including a shifter element for said drive means, means including a pair of interconnected members for actuating the shifter element, adjustable abutments on the interconnected members and separately operable during movement of the depositing means in one direction relative to said support to actuate the interconnected members, actuator means carried by the depositing means and operable when the latter is moving in the one direction aforesaid to engage one of said abutments, and cam actuated means for adjusting the actuator means to engage one of said abutments as aforesaid, the construction and arrangement of parts being such that reversal of the depositing means may take effect at different points in the travel of the depositing means in the one direction by engagement of the actuator means with a separate one of the plurality of abutments on different strokes of the depositing means in the one direction.

JOHN R. MILLAR.